United States Patent [19]

Maier et al.

[11] 4,452,480

[45] Jun. 5, 1984

[54] RECORD HANDLING DEVICE

[75] Inventors: Bruce R. Maier; Jon M. Risch, both of Columbia, Mo.

[73] Assignee: International Jensen Incorporated, Schiller Park, Ill.

[21] Appl. No.: 332,821

[22] Filed: Dec. 21, 1981

[51] Int. Cl.³ .............................................. B25J 15/00

[52] U.S. Cl. ........................................ 294/104; 294/3; 294/27 R

[58] Field of Search .................... 294/1 R, 2, 3, 6, 16, 294/27 R, 28, 29, 31 R, 32, 104, 106; 7/129–134, 158, 160, 167, 168; 30/2, 289, 294, DIG. 3

[56] References Cited

U.S. PATENT DOCUMENTS

| | | | |
|---|---|---|---|
| 161,128 | 3/1875 | LaBlanc et al. | 30/DIG. 3 |
| 1,365,227 | 1/1921 | Clark | 294/106 |
| 2,106,391 | 1/1938 | Duraj | 294/31 R |
| 2,723,877 | 11/1955 | Palmour et al. | 294/28 X |
| 3,044,097 | 7/1962 | Proschold | 294/6 X |
| 3,219,375 | 11/1965 | Van Pelt | 294/16 |
| 3,282,589 | 11/1966 | Morrison | 294/28 |
| 3,961,819 | 6/1976 | Yocum | 294/27 R |

*Primary Examiner*—Johnny D. Cherry

*Attorney, Agent, or Firm*—Willian, Brinks, Olds, Hofer, Gilson & Lione Ltd.

[57] ABSTRACT

A record handling device is disclosed which includes a frame which defines a handle and an arcuate record contacting member. This contacting member defines an arcuate groove sized to receive the peripheral edge of a record. A record retaining member is pivotably mounted to the frame so as to move between an open position, in which a record can freely be inserted in or removed from the groove, and a closed position, in which the record is captured in the groove. The record gripping device of this invention allows a record such as a phonographic record to be handled and transported safely and securely, without damage to the delicate recording surface. In addition, an album opening device is disclosed which comprises a groove defined by two sloping sidewalls and a base, and a blade situated within the groove.

17 Claims, 10 Drawing Figures

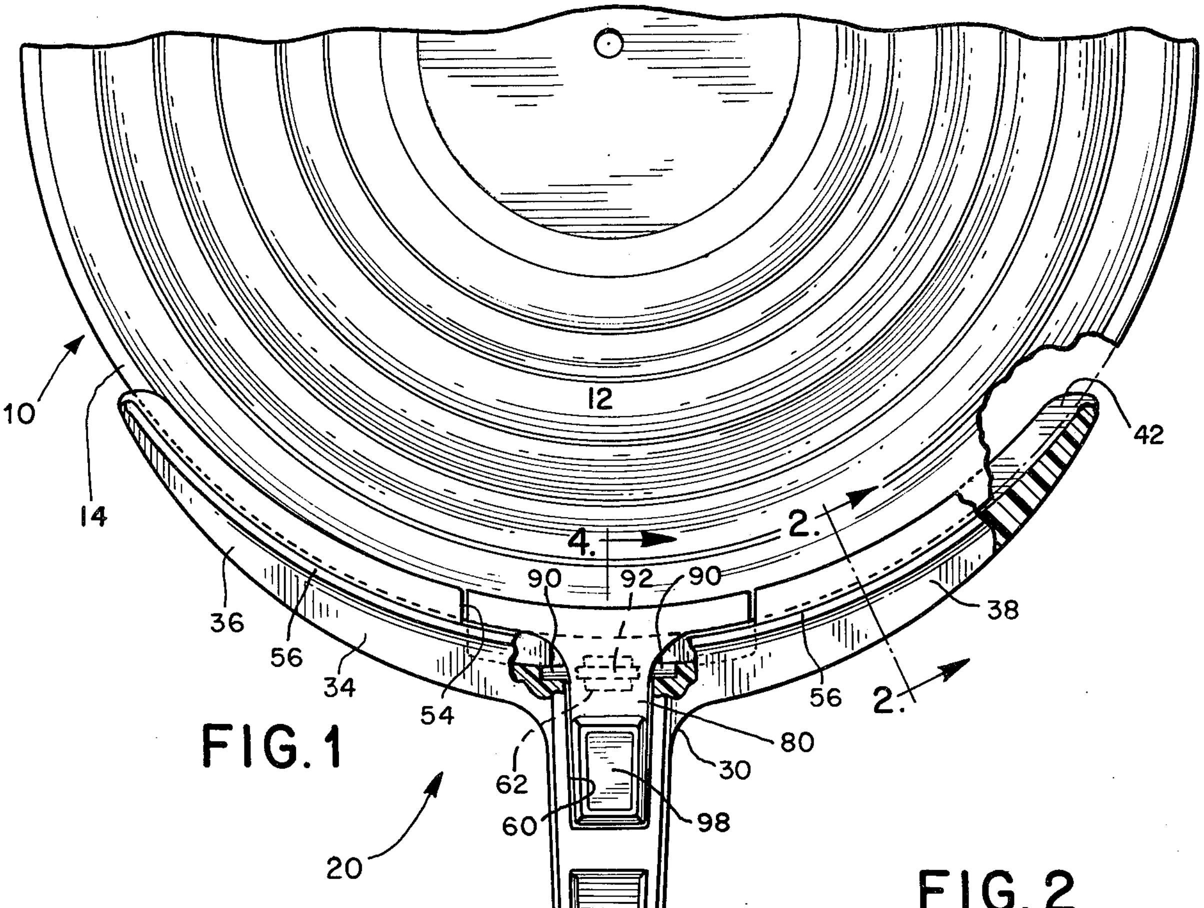
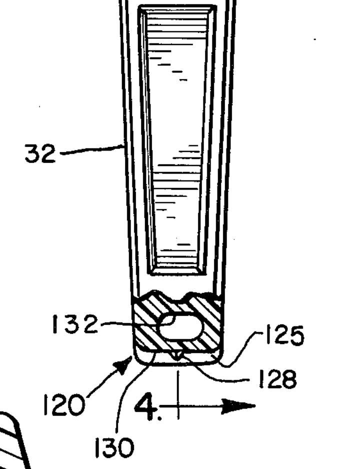
FIG.1
FIG.2
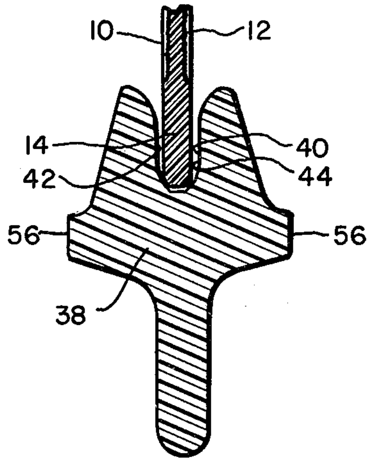
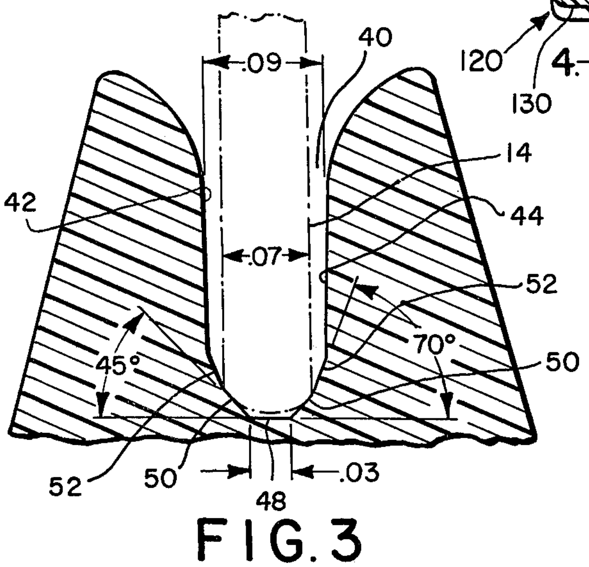
FIG.3
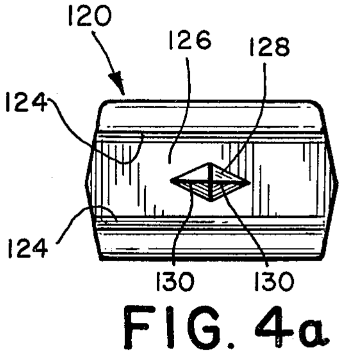
FIG. 4a

FIG. 7
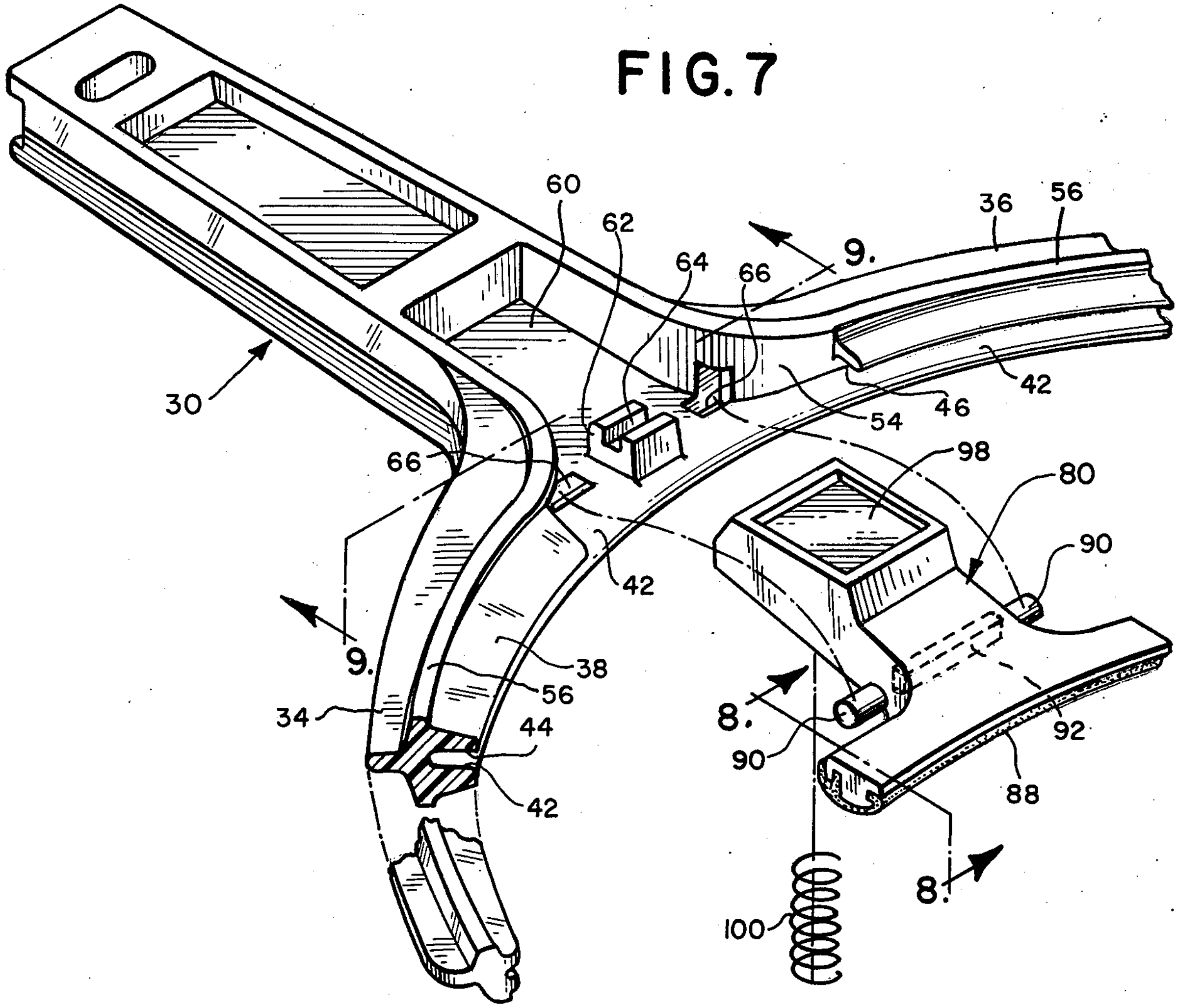
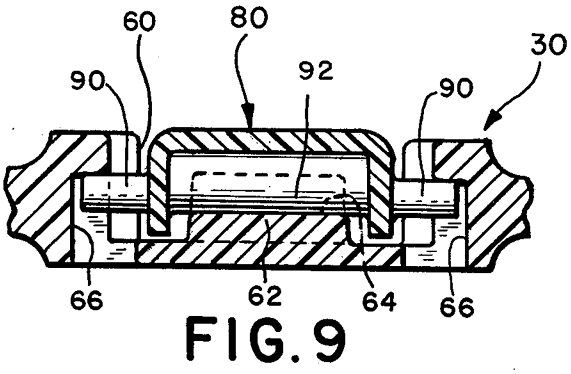
FIG. 9
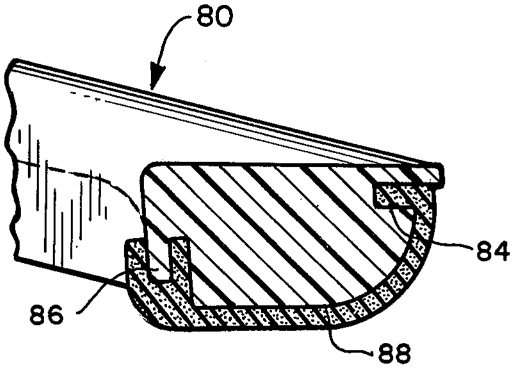
FIG. 8

RECORD HANDLING DEVICE

BACKGROUND OF THE INVENTION

The present invention is directed to a record handling device for use with records, as for example for transferring phonographic records between a protective jacket and a playback device such as a turntable.

Records such as phonographic records are physically fragile devices which can easily be damaged by improper handling. Fingerprints and scratches can cause significant damage to such records, and in extreme cases can even render records unusable. Nevertheless, records must be handled regularly in use. Phonographic records are customarily removed from a jacket manually, transferred to a playback device, and then returned to the jacket repeatedly over the life of the record. Such repeated handling presents many opportunities for damage to the record. Thus, a need exists for a record handling device to reduce handling damage to records.

It is accordingly an object of this invention to provide a record handling device which can be used to move a record between a jacket and a playback device, without contacting the recording surface of the record, and without bringing the hands of the user into contact with the record itself.

SUMMARY OF THE INVENTION

According to this invention, a record handling device is provided for a record the type having a peripheral edge. The gripping device of this invention comprises a frame which defines a handle and a record contacting member. The record contacting member is shaped to receive the record and to contact the peripheral edge of the record at at least three non-colinear points spaced along the edge of the record. In addition, a record retaining member is provided which defines a record gripping surface and is mounted to the frame such that the record gripping surface is positioned to contact and frictionally engage the peripheral edge of the record. The retaining member is movable between an open position, in which the record can be inserted into and removed from the contacting member, and a closed position, in which the peripheral edge of the record is captured between the gripping surface and the contacting member in order securely to couple the frame to the record. Preferably, a spring is provided to hold the retaining member in the closed position.

In the preferred embodiment described below, the contacting member defines an arcuate groove extending over an arc of at least 90° and sized to receive the peripheral edge of the record.

According to a second aspect of the present invention, a device for opening record albums is provided which comprises means for defining a groove having first and second side walls and a base, wherein the side walls converge toward the base such that the groove has a width which increases with increasing distance from the base. A blade is mounted to the base between the side walls in the groove, and the blade defines at least one cutting edge which extends along the length of the groove.

The record handling device of this invention is compact, inexpensive to produce, and well suited for mass production. It provides a firm, secure grip in records, without contacting or damaging delicate recording surfaces. The album opener of this invention, because of its sloping side walls, functions properly with either single record or dual record albums.

The invention itself, together with further objects and attendant advantages, will best be understood by reference to the following detailed description taken in conjunction with the accompanying drawings.

BRIEF DESCRIPTION OF THE DRAWINGS

FIG. 1 is a plan view of a preferred embodiment of the record handling device of this invention holding a record, in which the top of one of the arms is partially broken away to reveal a channel for receiving the record.

FIG. 2 is a cross-sectional view taken along line 2—2 of FIG. 1.

FIG. 3 is an enlarged fragmentary sectional view taken in the plane of FIG. 2.

FIG. 4*a* is an enlarged end view of the device of FIG. 1 showing the album opening device in detail.

FIG. 7 is an exploded perspective view in partial cutaway of the device of FIG. 1.

FIG. 8 is a cross-sectional view taken along line 8—8 of FIG. 7.

FIG. 9 is a fragmentary sectional view taken along line 9—9 of FIG. 7.

DETAILED DESCRIPTION OF THE PRESENTLY PREFERRED EMBODIMENTS

Figure 4:
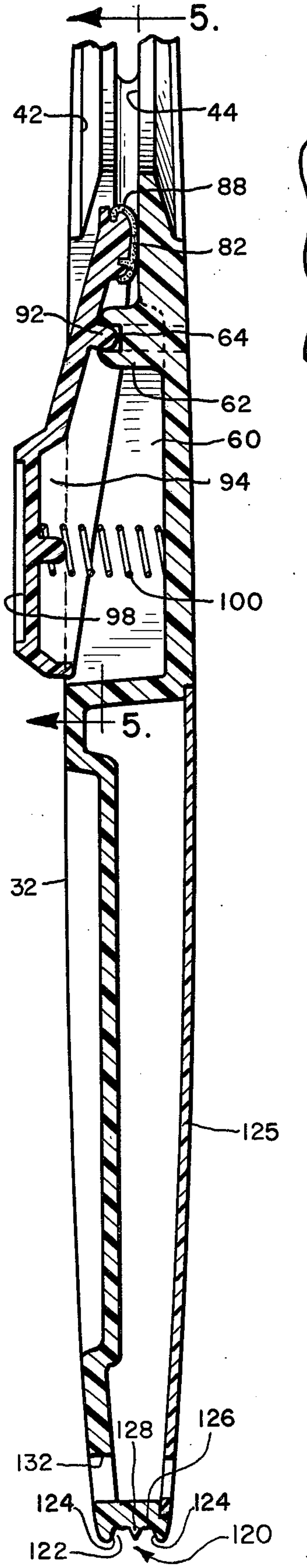
FIG. 4 is a cross-sectional view taken along line 4—4 of FIG. 1 showing the record retaining member in a closed position.

Turning now to the drawings, FIGS. 1 through 9 illustrate a presently preferred embodiment of the record handling device of this invention. This handling device 20 is designed to hold a standard long playing phonographic record 10 of the type having a centrally located annular recording surface 12 which is surrounded by a peripheral edge or rim 14. As is customary, the rim 14 is not used as a recording surface, and it is therefore ideally suited for handling the record 10. The handling device 20 is made up of two major components: a frame 30 and a record retaining member 80. The structures of these two components will first be described in detail, and then the operation of the handling device 20 will be discussed.

The frame 30 is a one piece, rigid structure which comprises a handle 32 which extends transversely to a record contacting member 34. The record contacting member 34 is arcuate in shape and can be thought of as comprising two arcuate arms 36,38 both of which extend outwardly from the handle 32 in the same plane. The edges of the arms 36,38 opposite the handle 32 define an arcuate channel or groove 40. As best seen in FIGS. 2 and 7, this groove 40 is bounded on one side by a first record contacting surface 42 which extends continuously from the arm 36 to the arm 38 over an arc of at least 90°. Opposite the first record contacting surface 42, the groove 40 is bounded by second and third record contacting surfaces 44,46 respectively. The second contacting surface 44 is defined by the arm 38 and the third contacting surface 46 is defined by the arm 36. The second and third record contacting surfaces 44,46 are not contiguous, but rather are separated by a central opening 54. Thus, the arcuate groove 40 is open in a central portion corresponding to the opening 54, but is defined by two opposed contacting surfaces 42,44 and 42,46 in the regions of the arms 36,38. As will be explained in detail below, the groove 40 is configured to engage the rim 14 of the record 10 along an arc of about 90°.

The frame 30 also defines a well 60 centrally positioned in the handle 32 near the record contacting member 34. Between the well 60 and the contacting member 34, the frame defines a central support block 62, which defines a c-shaped recess 64, and two slots 66. As will be explained below, the slots 66 function as pivot bearings, and the slots 66 and the recess 64 are colinear, extending in a line transverse to the handle 32 and substantially parallel to a tangent to the arc of the groove 40 adjacent the handle 32. Two ribs 56 are provided on the arms 36,38 in order to strengthen the arms 36,38.

The second major component of the holding device 20, the record retaining member 80, cooperates with the frame 30. The retaining member 80 defines a record gripping surface 82 at one end thereof. As best seen in FIG. 8, this gripping surface 82 defines an arcuate groove 84 and an arcuate rail 86. An elastomeric shoe 88 is positioned over the record gripping surface 82 and is held in place by the groove 84 and the rail 86. As will be explained below, the shoe 88 acts to protect the record 10 from scuffing and to provide excellent frictional engagement between the retaining member 80 and the record 10.

The retaining member 80 also defines two transversely mounted shafts 90, one of which extends out either side of the retaining member 80. A centrally mounted ridge 92 is also defined by the retaining member 80, co-axial with the shafts 90. A recess 94 is defined by the retaining member 80 adjacent the end of the retaining member 80 opposed to the gripping surface 82. A pin 96 is provided on the retaining member 80 within the recess 94. This pin 96 functions as a mounting structure for a coil spring 100. The outer surface of the retaining member 80 in alignment with the spring 100 functions as an operating surface 98.

The extreme end portion of the handle 32 defines a record album opening device 120. This opening device 120 comprises two converging side walls 124 which intersect a base 126. The side walls 124 and base 126 cooperate to define a groove 122. In this embodiment, the side walls intersect the base 126 at an angle of about 100°, such that the groove 122 is narrower at its innermost portions adjacent the base 126 than it is at outer portions. Preferably, the width of the base 126 is about 0.20 inches. A blade 128 is mounted to the base 126 between the side walls 124 within the groove 122. The height of the blade 128 in this embodiment is about half the depth of the groove 122. The blade 128 defines two cutting edges 130, each of which is oriented longitudinally to extend along the length of the groove 122. As will be explained in detail below, the opening device 120 is used to split the protective film generally applied to record albums. The sloping side walls 124 allow this opening device 120 to function properly either with single record album or with double record albums.

The holding device 20 also includes a back cover 125 which snaps on the back of the handle 32, and the handle 32 defines an opening 132 which can be used for storing the holding device 20.

The dimensions and materials used in constructing the holding device 20 can be modified as necessary to fit individual applications. One presently preferred embodiment of the invention utilizes the following specifications. It should be understood, however, that these specifications are merely illustrative of one embodiment of the invention, and are not to be construed as limiting.

In the illustrated embodiment, the radius of curvature of the groove 40 is about $11\frac{7}{8}$th inches. In this embodiment, the surfaces 50 intersect the base 48 of the groove 40 at an angle of about 45°, and the surfaces 52 are oriented at an angle of about 75° with respect to the base 48. The preferred dimensions of the groove 40, in inches, are shown in FIG. 3. The frame 30 is formed in a one-piece injection molding operation from 10% glass reinforced Delrin, available from E. I. DuPont deNemours of Wilmington, Del. The retaining member 80 can also be manufactured using the same techniques and materials as those used to manufacture the frame 30.

The spring 100 of this embodiment is formed of wire 0.25 inches in diameter wound into a coil $\frac{3}{4}$th inches long and about $\frac{1}{4}$th inch in outside diameter. This spring 100 has a spring constant of about $\frac{1}{4}$th pound per tenth of an inch compression, and it is installed between the retaining member 80 and the frame 30 such that when the retaining member 80 is in its fully rotated position as shown in FIG. 4, the spring 100 is compressed about 1/10th of an inch. Any suitable spring wire can be used to form the spring 100. For example, stainless steel spring wire or piano wire can be used. If piano wire is used, it should preferably be coated to prevent rusting. The shoe 88 can be extruded from neoprene to the desired cross-sectional shape, and then cut to the desired length. In this embodiment, the shoe 88 is about 0.25 inches in thickness. Preferably, the neoprene should have a hardness of between 40 and 60 durometers.

The holding device 20 is assembled by first securing the shoe 88 to the retaining member 80. The spring 100 is then placed on the pin 96, and the retaining member 80 is installed on the frame 30. This installation is accomplished by snapping the central ridge 92 into the recess 64 defined by the support block 62. Once the retaining member 80 is snapped in place in the frame 30, the shafts 90 and ridge 92 cooperate with the slots 66 and the recess 64 to mount the retaining member 80 pivotably to the frame 30. The spring 100 operates in compression, tending to rotate the retaining member 80 in a clockwise direction as seen in FIG. 4.

Figure 5:
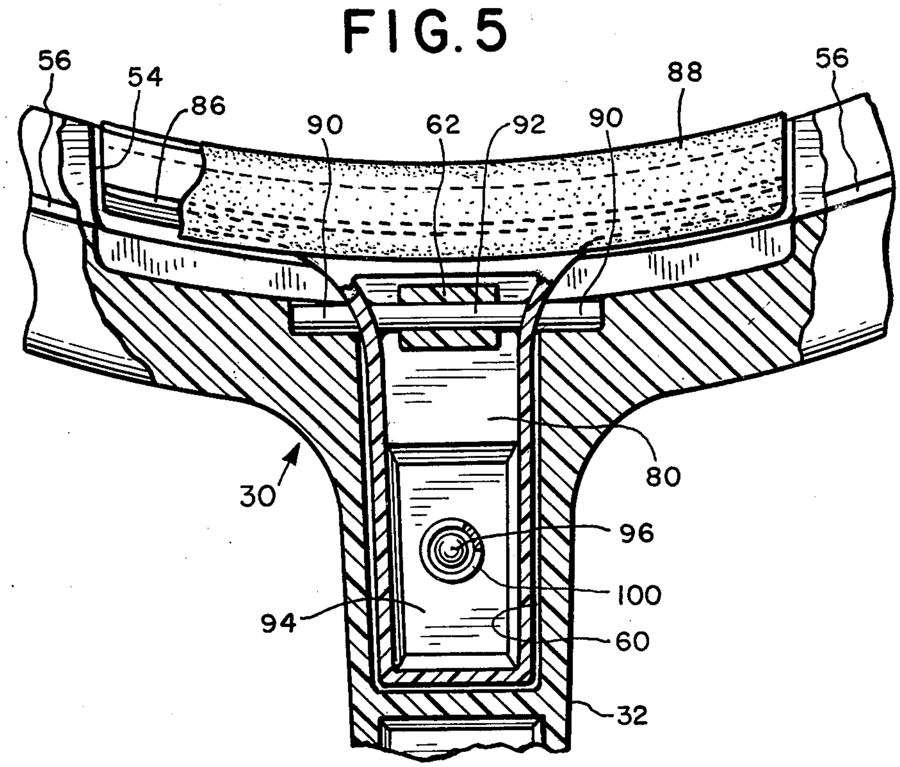
FIG. 5 is a partial sectional view taken along line 5—5 of FIG. 4.
Figure 6:
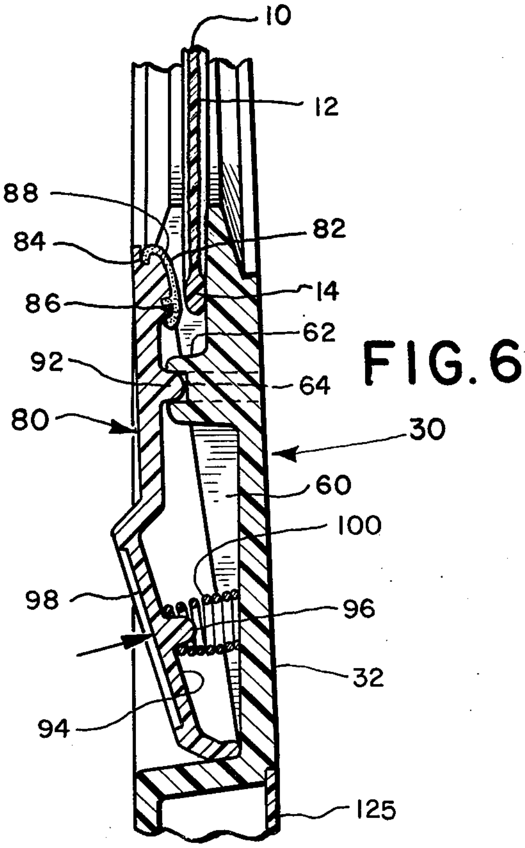
FIG. 6 is a cross-sectional view corresponding to that of FIG. 4 showing the record retaining member in an open position.

The operation of the holding device 20 can best be understood by reference to FIGS. 4 and 6. FIG. 4 shows the holding device 20 with the retaining member 80 in its rest position before the record 10 has been inserted in the holding device 20. In this rest position, which is sometimes referred to as the "closed position" herein, the shoe 88 is in direct contact with the first surface 42 of the groove 40. In order to insert a record into the holding device 20, an operator applies pressure to the operating surface 98 to compress the spring 100 and pivot the retaining member80 from the closed position shown in FIG. 4 to the open position shown in FIG. 6. As shown in FIG. 5, the gripping surface 82 is thereby moved out of the groove 40.

Once the retaining member 80 has been moved to the open position, the holding device 20 can be placed adjacent the record 10 such that the rim 14 of the record 10 fits into and is received by the groove 40. Once the record 10 is properly positioned, the operator then releases pressure from the operating surface 98, and allows the spring 100 to move the retaining member 80 clockwise as shown in FIG. 6 to bias the shoe 88 against the peripheral rim 14 of the record 10. The strength of the spring 100 has been chosen such that the forces generated by the spring 100 alone are adequate to capture the record 10 firmly in the holding device 20 such that the record 10 can be moved, transported, inserted into or withdrawn from a record album, or inserted on or removed from a turntable safely and securely. When it is desired to release the record 10 from the holding device 20 it is merely necessary to apply pressure to the operating surface 98 so as to rotate the retaining member 80 in a counterclockwise direction as shown in FIG. 6, thereby releasing the record 10 and allowing it to be removed from the groove 40.

The inner contact area of the channel (52, 50, 48) has been so configured to seat a wide range of record edges and thicknesses at an optimal average radius (5 15/16") . This effective radius (shown approximately where the line of #50 touches the drawing in FIG. 3) has a different center point than the radius of the outermost edge or tips of channel #40.

The curvature of the outer edge (towards the record) is set so as to avoid hooking the record when only one wingtip (36 or 38) is engaged at its end.

The above paragraph related to method of record engagement when taking the record out of the jacket, the recommended procedure being to engage the wingtip (end of 36) and then slide the DH forward maintaining the wingtip seating. Due to the curvature (read radius) of the outer edges of the channel, even if the record and DH were misaligned slightly, the record would tend to slide into the channel easily and naturally. If the radius and centerpoint of the outer edge were the same as that of the record section it covers when fully engaged, or the same as the radius of the record's edge, then if one wingtip were engaged, the other would have to be centered precisely with respect to the record's edge and the channel slot before the other wing would fully engage.

In order to use the album opening device 120, an album (not shown) is placed with one edge in the groove 122. The side walls 124 center the album on the blade 128 such that the blade 128 pierces any protective plastic film on the album. Then, by merely sliding the opening device 120 along the length of the album, the protective film can be slit open. Here, it should be understood that the side walls 124 provide the important advantage that they allow albums of varying thicknesses to be centered properly. A relatively thick, two-record album will not contact the base 126 of the groove 122. Rather, such a thick album will extend only partly into the groove 122. Nevertheless, the blade 128 is dimensioned so as to function properly with such a wide album. When a narrow album is used, the base 126 may well come into contact with the outermost edge of the album cover. Nevertheless, the side walls 124 still provide a centering effect, and the blade 128 is dimensioned to function properly even when the album cover contacts the base 126. Thus, in a simple and efficient manner, the opening device 120 functions properly and automatically without need for adjustment with either one-record or two-record albums.

From the foregoing, it should be apparent that a record handling device has been described which provides a number of important advantages. The handling device of this invention grips a record by its peripheral edge, without contact of any type with the delicate recording surface. Furthermore, this handling device provides a secure and reliable hold on the record. If properly used, it substantially eliminates the prospects of dropped or damaged discs due to handling. This handling device also keeps the hands and the fingerprints of the user well away from the delicate recording surface. Because the holding device 20 provides support to the record 10 along a considerable portion of its peripheral edge, the frame 30 is maintained in a co-planar relationship with the record 10. Thus, the holding device 20 can be used to hold the record at any desired orientation. The disclosed design is simple to assemble yet reliable in operation. This device can readily be operated with one hand, and only requires simple thumb pressure to move the retaining member as needed.

Though this invention has been described in conjunction with phonographic records, it should be understood that this invention is not limited to such records. Rather, it can be adapted for use with other types of records, such as video discs or magnetic storage discs for example. Throughout this application and the following claims the term "record" is used in its broad sense where the context permits so as to encompass all types of information carrying platters, disc shaped or not, including traditional high fidelity sound recordings, computer discs, and video discs of all technologies.

Of course, it should be understood that various changes and modifications to the preferred embodiments described above will be apparent to those skilled in the art. For example, the device can be made with a torsion spring rather than the coil spring illustrated. Alternatively, the device can be adapted for use with video discs, floppy or rigid computer memory discs, or phonographic recordings of other sizes. It is therefore intended that the foregoing detailed description be regarded as illustrative of the presently preferred embodiment rather than as limiting. It is the following claims, including all equivalents, which are intended to define the scope of this invention.

We claim:

1. A device for handling a record having a peripheral edge, said device comprising:

a frame defining a handle and a record contacting member coupled to the handle, said contacting member shaped to receive a record and to contact an arcuate peripheral edge of the record at at least three non-colinear points spaced along the peripheral edge, said record contacting member having an inner edge, and outer edge, two spaced side walls and a base, the side walls adjoining the base at an oblique angle at the inner edge of the contacting member, such that the side walls and the base together define a beveled groove, and said side walls each further defining a rounded inwardly sloped lip at the outer edge of the contacting member, said sloped lips adapted to guide the peripheral edge of the record into the beveled groove when the contacting member is brought into contact with one of the non-colinear points along the peripheral edge of the record;

a record retaining member defining a record gripping surface;

means for mounting the record retaining member to the frame such that the record gripping surface is positioned to contact and frictionally engage the peripheral edge of the record and the retaining member is movable between an open position, in which the record can be inserted into and removed from the contacting member, and a closed position, in which the peripheral edge of the record is captured between the gripping surface and the contacting member, so that the frame is securely coupled to the record;

an operating surface defined by the retaining member, said operating surface positioned such that pressure applied to the operating surface operates to move the retaining member to the open position; and biasing means for automatically returning the retaining member to the closed position whenever pressure is absent from the operating surface and for maintaining the retaining member in the closed position with sufficient force to hold the record firmly and securely between the gripping surface and the contacting member until pressure is reapplied to the operating surface.

2. The invention of claim 1 wherein the biasing means comprises a spring mounted between the frame and the retaining member.

3. The invention of claim 1 wherein the contacting member defines an arcuate groove sized to receive the peripheral edge.

4. The invention of claim 1 further comprising an album opening device comprising:

means for defining a groove having first and second side walls and a base, wherein the side walls converge toward the base such that the groove has a width which increases with increasing distance from the base;

a blade mounted to the base within the groove between the side walls, said blade defining at least one cutting edge extending along the groove.

5. A device for handling a record having a central recorded portion surrounded by a circular, peripheral, unrecorded rim having a given radius of curvature, said device comprising:

a record contacting member which defines an arcuate groove sized to receive the rim of the record, said groove having an opening formed in a central portion thereof, and having two side walls and a base together defining an inner contact area formed by the side walls converging toward the base in a series of oblique angles, said groove also having an outer edge defined by two rounded inwardly sloping lips each integrally formed with one of the side walls, said inner contact area having a first effective radius of curvature substantially equal to the given radius of curvature of the unrecorded rim of the record, measured from a first centerpoint, said centerpoint disposed centrally to the record, to a point where one of the converging side walls of the record contacting member contacts the unrecorded rim of the record in the inner contact area, and said outer edge having a second radius of curvature measured from a second centerpoint, said first radius of curvature being greater than said second radius of curvature, and said first centerpoint being closer to the inner contact area than said second centerpoint, such that when the record contacting member is partially brought into engagement with the unrecorded rim of the record, full engagement with the inner contact area is facilitated;

a handle rigidly mounted to the contacting member;

a record retaining member having one end defining an arcuate record gripping surface and another end defining an operating surface;

means for mounting the retaining member to the handle such that the gripping surface is positioned adjacent the opening in the arcuate groove and the retaining member is movable between an open position, in which the record can freely enter and leave the groove, and a closed position, in which the gripping surface engages the rim to capture the record in the groove; and a spring mounted on said other end of the retaining member and operative to bias the retaining member to the closed position with sufficient force to securely retain the record in the groove when a counter-biasing force is absent from the operating surface.

6. The invention of claim 5 wherein the groove extends over an arc of at least about 90°.

7. The invention of claim 5 wherein the gripping surface comprises an elastomeric material.

8. The invention of claim 5 wherein the mounting means defines a pivot axis, wherein the spring and the gripping surface are positioned on opposite sides of the pivot axis, and wherein the retaining member defines an operating surface positioned on the same side of the pivot axis as the spring.

9. The invention of claim 5 wherein the spring is a coil spring mounted between the handle and the retaining member.

10. The invention of claim 5 further comprising an album opening device comprising:

means for defining a groove having first and second side walls and a base, wherein the side walls converge toward the base such that the groove has a width which increases with increasing distance from the base;

a blade mounted to the base within the groove between the side walls, said blade defining at least one cutting edge extending along the groove.

11. A device for gripping a record having a central recorded portion surrounded by a circular, peripheral, unrecorded rim, said device comprising:

a frame;

a handle, included in the frame and positioned on a first side of the frame;

an arcuate record contacting member, included in the frame and positioned on a second side of the frame, opposed to the handle, said contacting member defining a rigid continuous first arcuate contacting surface having first and second ends and extending over an arc of at least 90°, a second arcuate contacting surface mounted in a spaced, parallel relationship to the first contacting surface adjacent to the first end, and a third arcuate contacting surface mounted in a spaced, parallel relationship to the first contacting surface adjacent the second end, said first, second and third arcuate contacting surfaces cooperating to define an arcuate channel shaped to receive a rim of a record;

a record retaining member defining an arcuate record gripping surface positioned between the second and third contacting surfaces adjacent the first contacting surface on a first end of the retaining member, and an operating surface positioned on a second end of the retaining member, opposed to the gripping surface, said retaining member pivotable between an open position, in which the record can be moved in and out of the channel, and a closed position, in which the gripping surface captures the record against the first contacting surface in the groove; and a spring mounted between the second end of the retaining member and the handle to bias the retaining member to the closed position with sufficient force to securely hold the record in the channel.

12. The invention of claim 11 wherein the gripping surface comprises an elastomeric material.

13. The invention of claim 11 further comprising an album opening device comprising:

means for defining a groove having first and second side walls and a base, wherein the side walls converge toward the base such that the groove has a width which increases with increasing distance from the base;

a blade mounted to the base within the groove between the side walls, said blade defining at least one cutting edge extending along the groove.

14. A device for handling a record having a curved peripheral edge and a central recorded portion, the device comprising essentially only:

a frame defining a handle and an arcuate record contacting member integrally formed with the handle, the contacting member comprising an integrally formed, rigid, continuous record contacting surface and means for defining a centrally located opening situated to expose the record contacting surface; and a record retaining member pivotally mounted on the frame having a record gripping surface positioned adjacent to the opening and opposed to the contacting surface and pivotable between an open position, in which the record may be inserted into and withdrawn from the contacting member, and a closed position, in which the record is captured between the gripping surface and the contacting surface;

the gripping surface defining an arc having a radius of curvature substantially the same as that of the peripheral edge such that the gripping surface contacts the peripheral edge along substantially the entire arc without contacting the recorded portion of the record; and spring means mounted between the handle and the record retaining member and operative to bias the retaining member in the closed position with sufficient force to securely retain the record in the contacting member.

15. The invention of claim 14 wherein the spring means comprises a coiled spring.

16. A device for handling a record having a peripheral edge defining a given radius of curvature measured from a first centerpoint, disposed centrally to the record, the device comprising:

a frame defining a handle and an arcuate record contacting member coupled to the handle, the record contacting member having an inner contact area, an outer edge, a first side wall, a second side wall and a base, the first and second side walls converging toward the base in a series of intersecting oblique angles to form, together with the base, the inner contact area, said inner contact area defining effective radii of curvature approximately at intersections of the oblique angles, including a first effective radius of curvature, measured from the first centerpoint of the record to a point where one of the first and second converging side walls of the record contacting member contacts the edge of the record in the inner contact area, substantially equal to the given radius of curvature of the record, and said outer edge of the contacting member defined by a first and a second rounded inwardly sloping lip each integrally formed with one of the first and second side walls respectively, said first and second lips adapted to guide the edge of the record into the inner contact area, and said outer edge of the contacting member having a second radius of curvature measured from a second centerpoint, said second radius of curvature being smaller than said first radius of curvature, and said first centerpoint disposed closer to the inner contact area than said second centerpoint, such that when a portion of the record contacting member is brought into engagement with the edge of the record, full engagement of the inner contact area with the edge of the record is facilitated due to the combination of the first and second rounded lips at the outer edge of the contacting member and the smaller second radius of curvature of said outer edge relative to the given radius of curvature of the edge of the record;

the frame further defining a central opening in the second side wall situated to expose the first side wall of the record contacting member, such that the first side wall of the record contacting member is continuous and the second side wall of the record contacting member is discontinuous.

a record retaining member pivotally mounted on the frame having a record gripping surface positioned adjacent to the opening and opposed to the first side wall and pivotable between an open position, in which the record may be inserted into and withdrawn from the contacting member, and a closed position, in which the record is captured between the gripping surface and the first side wall; and spring means mounted between the handle and the record retaining member and operative to bias the retaining member in the closed position with sufficient force to securely retain the record in the contacting member.

17. The invention of claim 11 wherein the arcuate channel defines a beveled inner contact surface.

* * * * *